(No Model.)

J. O. CATLETT & T. A. BRANT.
FODDER CUTTING MACHINE.

No. 422,009. Patented Feb. 25, 1890.

WITNESSES
C. C. Burdine
C. S. Fry

J. O. Catlett
T. A. Brant
INVENTORS

By Their Attorney
W. T. Fitzgerald

UNITED STATES PATENT OFFICE.

JOSEPH O. CATLETT AND THORNT. A. BRANT, OF LAWN RIDGE, KANSAS.

FODDER-CUTTING MACHINE.

SPECIFICATION forming part of Letters Patent No. 422,009, dated February 25, 1890.

Application filed April 5, 1889. Serial No. 306,136. (No model.)

*To all whom it may concern:*

Be it known that we, JOSEPH O. CATLETT and THORNT. A. BRANT, citizens of the United States, residing at Lawn Ridge, in the county of Cheyenne and State of Kansas, have invented certain new and useful Improvements in Fodder-Cutting Machines; and we do hereby declare the following to be a full, clear, and exact description of the invention, such as will enable others skilled in the art to which it appertains to make and use the same.

Our invention relates to improvements in corn-fodder cutters; and it consists in certain novel features hereinafter described and claimed.

Figure 1:
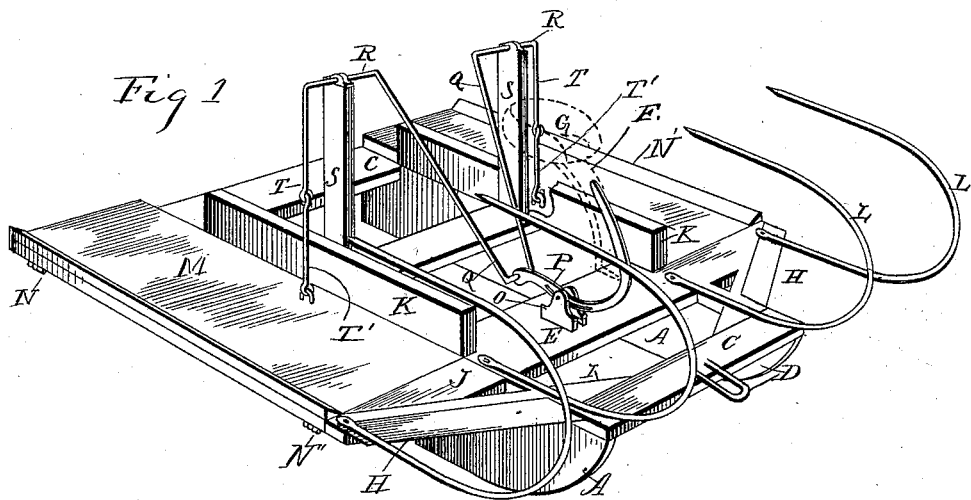
Figure 2:
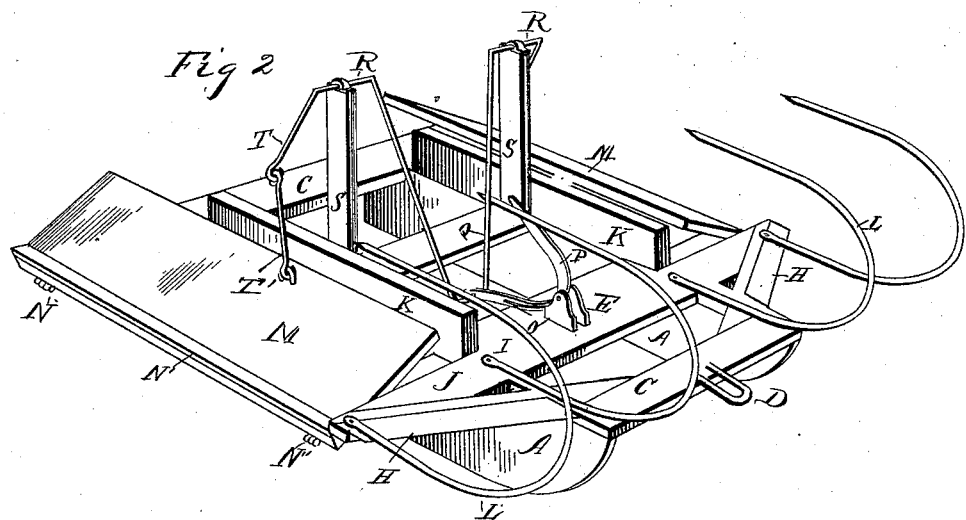

In the accompanying drawings, Figure 1 is a perspective view of our improved machine, and Fig. 2 is a similar view showing the wings or dumping-tables raised.

As a carriage for our invention we employ the runners A A, which may be of any desired size, and are connected at their front and rear ends by the cross-bars C C, as shown, the draft bar or hook D being secured to the front cross-bar C and projecting forward therefrom. The runners are further connected at an intermediate point of their length by the platform E, on which is erected a standard F, the driver's seat G being secured upon and supported by said standard.

The cutting-knives H H are arranged horizontally at the outer sides of the runners, near the front ends of the same, and are inclined rearwardly and outwardly, so that they will effect a drawing cut on the stalks, and thereby sever them easily and readily. The knives are secured on the inclined arms I I, projecting laterally from the runners, and these arms are braced by the small platforms J, which are arranged in rear of the arms and adapted to receive and partially support the stalks as they fall after being cut. These platforms J may be continuations of the main platform, and for the sake of economy we prefer to so construct them. At the sides of the platforms J we provide the rails K, which prevent the cut stalks rolling from the platform, and the guide-arms L are secured to and project forward from the said platforms. These guide-arms are constructed of wire, as shown, and are adapted to pass along the opposite sides of a row of cornstalks and direct them to the knives, and also prevent the stalks being pushed to one side by the knives, so that they will not be cut.

In rear of the platforms J we arrange the wings or dumping-tables M, which are secured at their outer edges by the hinges N to suitable supports projecting laterally from the runners, so that they can be swung upward and outward to dump the fodder gathered thereon. The wings are provided with the longitudinal ledges N' on their upper sides, at their outer edges, to prevent the premature discharge of the stalks.

The wings or dumping tables are operated to discharge the gathered fodder by the mechanism we will now proceed to describe. On the platform E, adjacent to the standard F, we secure a knee O, on which is fulcrumed a lever P, the rear end of which is turned upward and connected by crank-arms Q with the inner ends of the rock-shafts R. These oscillating levers R are journaled on the upper ends of the standards S, which are erected on the runners in rear of the platform E, and their outer ends are connected by the arms T and the links T' with the dumping-tables, the said links having their opposite ends connected to the dumping-tables and the ends of the rock-shafts R, respectively, by universal joints.

In practice the machine is drawn over the field between two rows of corn, and the guide-arms L will pass on opposite sides of the stalks in each row, and the stalks thereby guided to the knives, as before stated. As the machine advances the knives will pass across and through the stalks, thereby severing them, as will be readily understood. The stalks after being severed fall over into the side platforms and the dumping-tables, and will be supported and carried thereby. When a sufficient number of stalks have been gathered on the platforms and the dumping-tables, the free end of the operating-lever is raised, thereby depressing the inner ends of the oscillating levers and raising the outer ends of the same, so as to elevate the inner sides of the dumping-tables. As such tables are raised they will swing outward, as will be readily understood, and the stalks will thus be lifted and discharged over the sides of the machine.

From the foregoing description, taken in connection with the accompanying drawings, it will be seen that we have provided a very efficient machine, which is simple in its construction, and which is strong and durable.

Having thus described our invention, what we claim, and desire to secure by Letters Patent, is—

The combination of the frame, the standards S thereon, the outwardly and upwardly swinging dumping-tables arranged on the sides of the frame, the rock-shafts journaled on the standards, the arms T and links connecting the levers with the tables, the operating-lever mounted on the frame and connected with the tables, the outwardly-projecting inclined knives secured to the frame in advance of the tables, and the guide-arms secured to and projecting forward from the frame, as set forth.

In testimony whereof we affix our signatures in presence of two witnesses.

JOSEPH O. CATLETT.
THORNT. A. BRANT.

Witnesses:
J. A. McCALL,
L. W. McCARTY.